(12) United States Patent
Sciortino

(10) Patent No.: US 10,800,356 B1
(45) Date of Patent: Oct. 13, 2020

(54) INTERNAL LICENSE PLATE FASTENING SYSTEM

(71) Applicant: Paul Sciortino, New Orleans, LA (US)

(72) Inventor: Paul Sciortino, New Orleans, LA (US)

( * ) Notice: Subject to any disclaimer, the term of this patent is extended or adjusted under 35 U.S.C. 154(b) by 0 days.

(21) Appl. No.: 16/550,483

(22) Filed: Aug. 26, 2019

(51) Int. Cl.
*B60R 13/10* (2006.01)
*G09F 7/18* (2006.01)

(52) U.S. Cl.
CPC ............ *B60R 13/105* (2013.01); *G09F 7/18* (2013.01); *G09F 2007/1843* (2013.01); *G09F 2007/1865* (2013.01); *G09F 2007/1895* (2013.01)

(58) Field of Classification Search
CPC ................. G09F 2007/1865; G09F 2007/1895
USPC ......................................................... 293/106
See application file for complete search history.

(56) References Cited

U.S. PATENT DOCUMENTS

| | | | | |
|---|---|---|---|---|
| 2,977,700 | A * | 4/1961 | Deeley-Jones | B60R 13/105 40/202 |
| 3,274,723 | A * | 9/1966 | Jacobs | B60R 13/105 40/209 |
| 4,891,895 | A * | 1/1990 | DeLaquil, Jr. | B60R 13/10 40/201 |
| 6,006,459 | A * | 12/1999 | Kosmach | B60R 13/105 40/200 |
| 2011/0133499 | A1* | 6/2011 | Hope | B60R 9/06 293/117 |
| 2012/0068492 | A1* | 3/2012 | Lucas | B60R 9/065 296/37.1 |
| 2015/0194082 | A1* | 7/2015 | McEwan | B60R 13/105 40/209 |
| 2015/0360604 | A1* | 12/2015 | Cameron | B60R 13/105 40/204 |

* cited by examiner

*Primary Examiner* — Kristina N Junge
(74) *Attorney, Agent, or Firm* — AdamsIP, LLC; Stephen Thompson; J. Hunter Adams

(57) ABSTRACT

A system and method for installing a tag is provided. The system and method of the present disclosure are generally designed to allow a user to internally install a tag within their vehicle in a way that prevents theft. The system generally comprises a safety window, sleeve, and holder. A tag may be attached to a holder and inserted into the sleeve in a way that allows the tag to be viewed on the exterior of the vehicle through the safety window. The system may also comprise a mechanical fastener that secures the holder within the sleeve.

19 Claims, 6 Drawing Sheets

INTERNAL LICENSE PLATE FASTENING SYSTEM

FIELD OF THE DISCLOSURE

The subject matter of the present disclosure refers generally to a system and method for internally fastening license plates to a vehicle.

BACKGROUND

License plates can sometimes be difficult to attach to a vehicle. This is especially true if one does not have the correct tools for attaching said license to plate to their vehicle. For instance, if one has a license plate screw that requires a Philips head screwdriver but they possess only a flat head screw driver, loosening the screw that would allow for one to attach the license plate becomes a problem. Additionally, rust and corrosion caused by exposure to external conditions can make installing a license plate even more difficult by causing the attachment means to get stuck. Rust and corrosion may also affect externally installed license plates themselves and make it difficult for law enforcement to read the corroded license plate, forcing one to replace the corroded license plate or risk a fine. Further, externally installed license plates attached to a vehicle by way of a screw or some other mechanical fastening means are relatively easy to steal. License plates are stolen for multiple reasons. A thief could simply want a collection of license plates having different designs or the stickers needed for registration. The thief could also steal plates and place them on a comparable vehicle for the purpose of committing a crime and throwing police off during the ensuing investigation. Not only does this inconvenience police by putting them behind in an investigation, but one whose plate was stolen may be questioned/arrested in connection for a crime they didn't commit.

Accordingly, there is a need in the art for an internal license plate system that allows a user to easily internally install a license plate in their vehicle while also preventing corrosion and theft.

DESCRIPTION

A system and method for installing a license plate is provided. In one aspect, the system and method simplify the process of installing a license plate by creating a system that does not necessarily require a user to possess any tools. In another aspect, the system and method protect the license plate from external elements, reducing the damage and corrosion a license plate may otherwise receive if attached externally. In yet another aspect, the system and method allow a user to attach a license plate to their vehicle in a way that makes theft difficult. Generally, the system and method of the present disclosure is designed to allow a user to internally install a license plate within their vehicle that is visible to someone looking at the exterior of the vehicle. The system generally comprises a safety window, sleeve, and holder. The various method steps associated with the methods of the present disclosure may be carried out by a user using the system disclosed herein.

The safety window of the internal tag fastening system is attached to the vehicle, wherein an exterior side of the safety window is exposed to the area exterior to the vehicle and an interior side of the safety window is exposed to the area interior to the vehicle. The safety window is designed in a way such that a tag located on the interior of a vehicle and behind the interior side of the safety window may be viewed by someone external to the vehicle peering at the exterior side of said safety window. Therefore, in the preferred embodiment, the safety window is transparent. An aperture having an internal opening and extending through the vehicle 101 to an external opening allows for a tag to be displayed behind the interior side of said safety window. The aperture itself is defined by an aperture wall, which preferably comprises the frame of the vehicle. In a preferred embodiment, the size of the aperture is at least as large as the tag that is to be installed. To protect the interior of the vehicle from external elements that might otherwise seep in through the seal created by safety window and vehicle, a sealant may be used to waterproof the seal. Alternatively, a weather stripping along the edge of the safety window may be used to create a water tight seal.

A sleeve is fitted within the aperture, which secures a holder in a way such that the holder may display the tag through the safety window. The sleeve may be any shape so long as it can fit within the aperture. The sleeve may be fastened to the body of the vehicle using a binder or a mechanical fastener, such as rivets, screws, nails, bolts, etc. The holder is designed to securely fit within the sleeve so that it doesn't move around within the aperture. The height and width of the holder is preferably at least as large as the tag but small enough to fit within the sleeve. The holder comprises a plate side and an internal side. The plate side of the holder allows for attachment of a tag. The holder may have any shape so long as it can fit within the sleeve and possess a plate side and internal side. In one preferred embodiment of a holder, the holder may comprise at least one bolt that may be used to secure the holder within the sleeve. The at least one bolt is preferably attached to the holder in a way such that it may be slideably manipulated. In one embodiment of a holder having at least one bolt, a user may move the bolt in a way such that the at least one bolt makes contact with the sleeve. Friction force created between the at least one bolt and sleeve may then prevent the holder from changing positions within the sleeve.

In one preferred embodiment, the sleeve may comprise at least one hole, wherein the at least one bolt of the holder is designed to fit within the at least one hole of the sleeve. In yet another preferred embodiment, the vehicle may also have at least one hole designed to accept the at least one bolt of the holder. The at least one hole and at least one bolt may be designed to align in a way that allows for optimal display of the tag through the safety window. In some preferred embodiments of a holder, the holder may further comprise a gasket. The gasket may be used to prevent contact between the tag within the holder and the safety window. In other preferred embodiment, the holder may further comprise a handle. The handle may be used to help remove or insert the holder into the sleeve of the internal tag fastening system.

A user may install a license plate using the vehicle using the following method. A user may obtain a vehicle having an internal tag fastening system and a tag. The user may then access to the internal tag fastening system unlock the holder. Once the holder is unlocked, the user may remove the holder form the sleeve and check for a prior tag. If a prior tag exists, the user may remove it and install the new tag, otherwise the user just needs to install the new tag in the holder. Once the new tag has been inserted in the holder, the user may place the holder back into the sleeve and lock it into place. The user may then close the vehicle and check to make sure the tag is displayed correctly.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other methods for carrying out the same purpose of the methods disclosed herein. Those skilled in the pertinent art should also realize that such equivalent modifications do not depart from the scope of the methods of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the Claims below, and in the accompanying drawings, reference is made to particular features, including process steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally. Where reference is made herein to a process comprising two or more defined steps, the defined steps can be carried out in any order or simultaneously (except where the context excludes that possibility), and the process can include one or more other steps which are carried out before any of the defined steps, between two of the defined steps, or after all the defined steps (except where the context excludes that possibility).

The term "comprises" and grammatical equivalents thereof are used herein to mean that other components, steps, etc. are optionally present. For instance, a system "comprising" components A, B, and C can contain only components A, B, and C, or can contain not only components A, B, and C, but also one or more other components. The term "at least one of . . . and" and grammatical equivalents thereof are used herein to mean that at least one of a group of items is present but more components of that group can be present. For instance, a system comprising at least one of components A, B, and C can contain only components A and B, or can contain multiple components A and C, but only one of component B. As used herein, the term "at least one" and grammatical equivalents thereof are used herein to mean that one or more of an item is present. For instance, at least one magnet means that an embodiment exists with a single magnet as well embodiments with multiple magnets. As used herein, the term "tag" and grammatical equivalents thereof may refer to license plates and other fixtures that might be used to display something other than a vehicle's current registration. For instance, a tag may also include a fixture displaying which university a driver of a vehicle attended.

Figure 1:
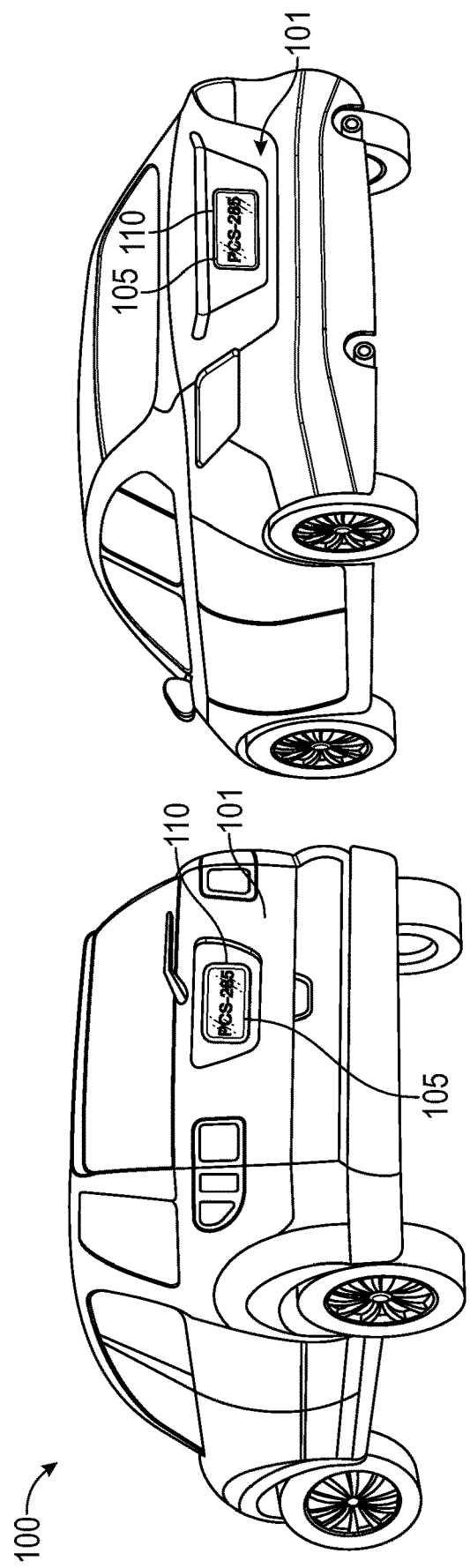
FIG. 1 is a perspective view of vehicles having an internal license plate system.
Figure 2:
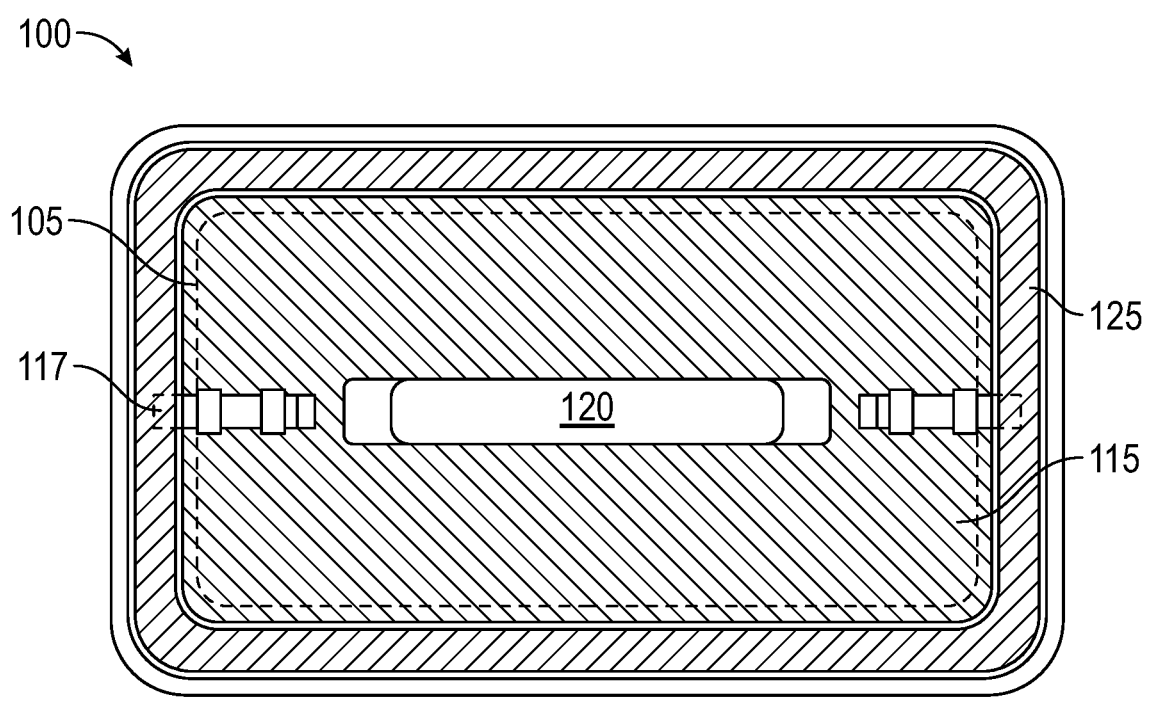
FIG. 2 is a back view of an internal license plate system installed within a vehicle.
Figure 3:
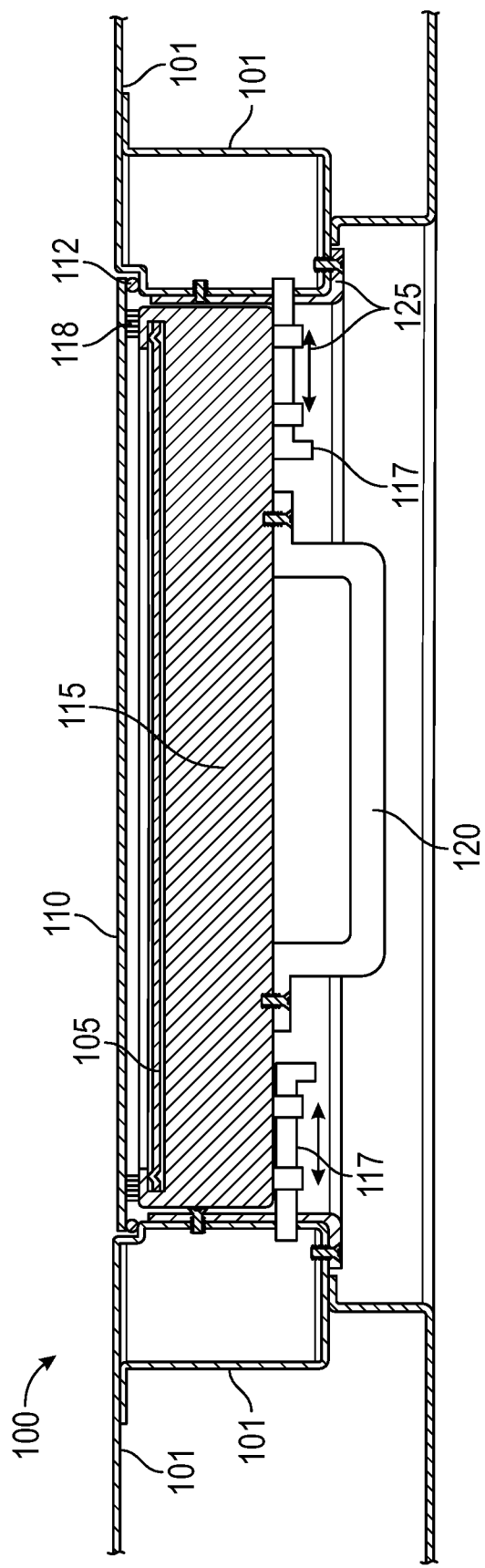
FIG. 3 is a bird's eye view of an internal license plate system installed within a vehicle.
Figure 4:
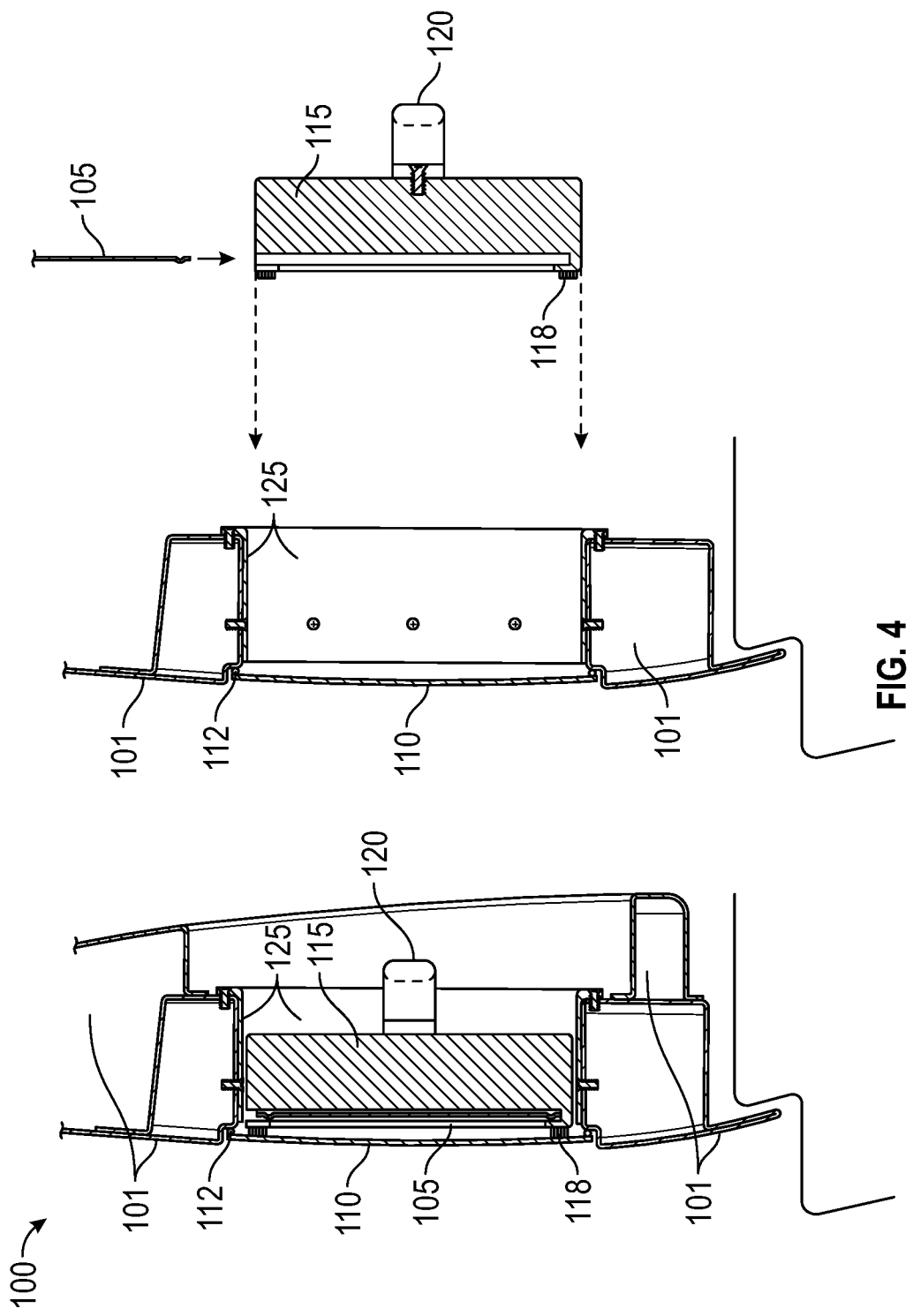
FIG. 4 is a bird's eye view of an internal license plate system installed within a vehicle.
Figure 5:
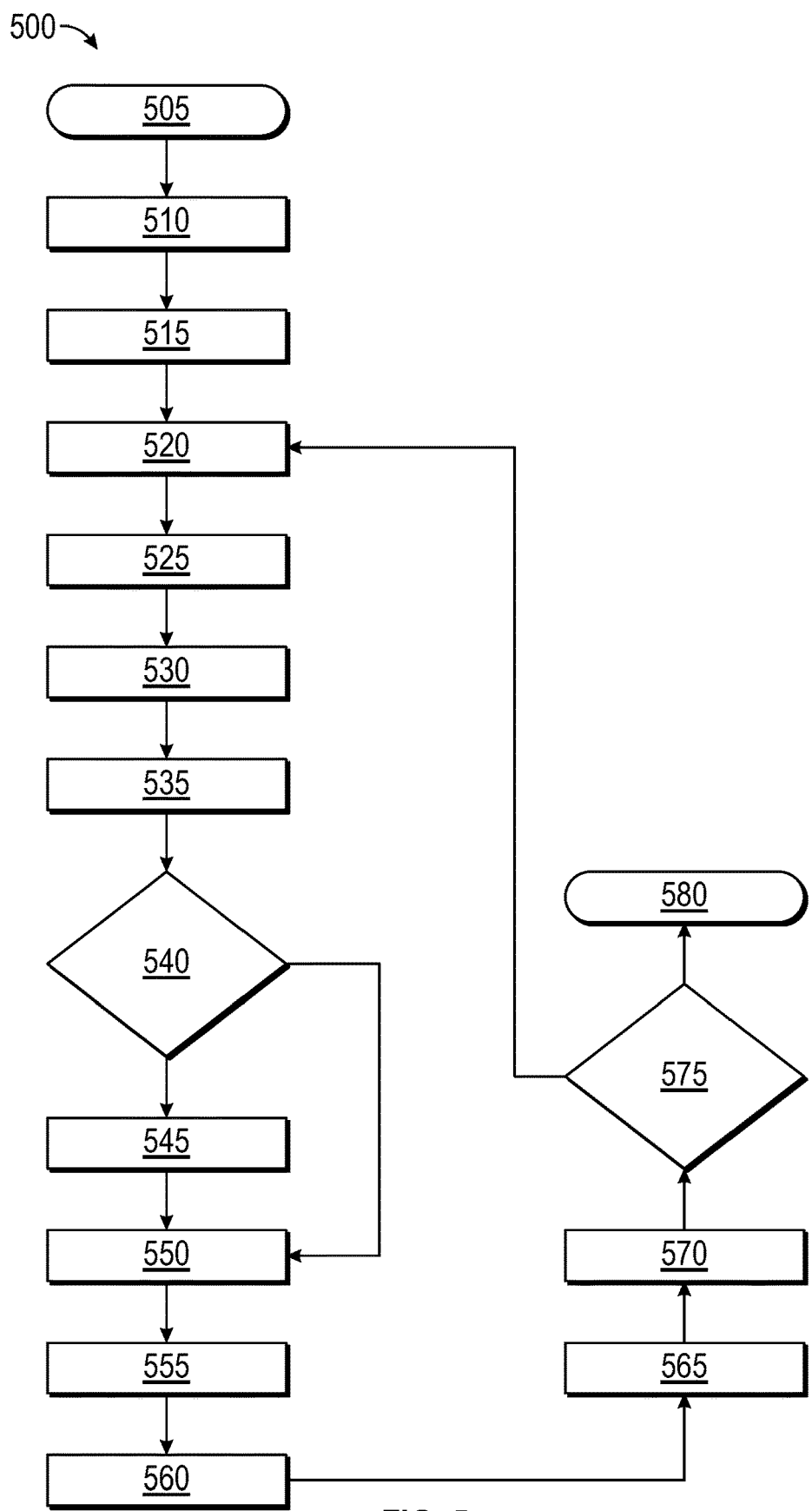
FIG. 5 is a flow chart illustrating certain method steps of a method embodying features consistent with the principles of the present disclosure.
Figure 6:
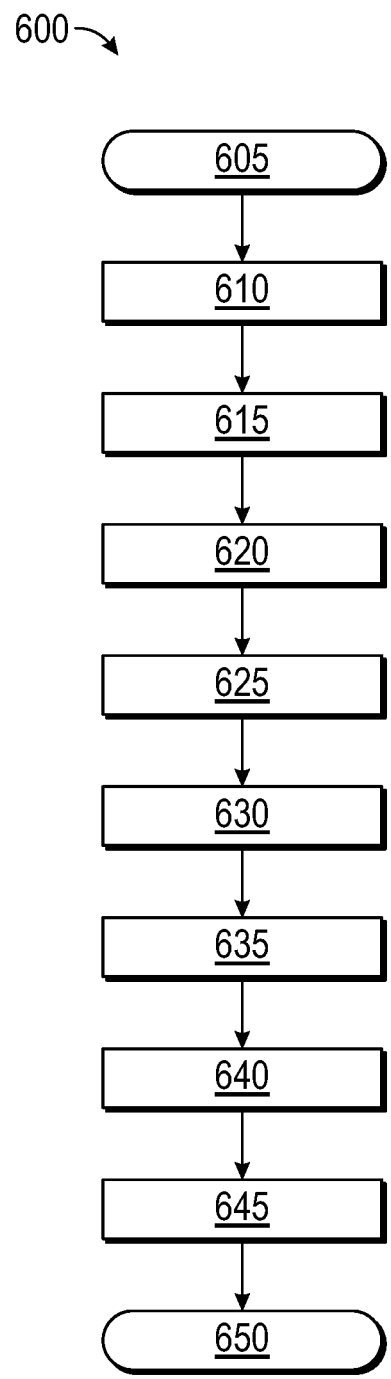
FIG. 6 is a flow chart illustrating certain method steps of a method embodying features consistent with the principles of the present disclosure.

FIGS. 1-6 illustrate embodiments of an internal tag fastening system 100 that may be used to secure a tag 105 to a vehicle 101. It is understood that the various method steps associated with the methods of the present disclosure may be carried out by a user using the system 100 shown in FIGS. 1-4. The system 100 comprises a safety window 110, sleeve 125, and a holder 115. As illustrated in FIG. 1, the system 100 does not comprise any fasteners that may be accessed by a user on the external portion of a vehicle 101. To access the tag 105, one would have to have access to the internal portion of the vehicle 101. FIG. 2 illustrates a back view of the internal tag fastening system 100, which is the side of the internal tag fastening system 100 a user would see from the interior of a vehicle 101. As shown in FIG. 3, the tag 105 sits behind a safety window 110, which allows for the tag 105 to be viewed by someone exterior to the vehicle 101 even though the tag 105 is not externally attached. FIG. 4 illustrates how the tag 105 may be inserted/removed from the vehicle 101 using the internal tag fastening system 100. FIGS. 5 and 6 illustrate various methods that may be carried out by a user using the system 100 of FIGS. 1-4.

The safety window 110 of the internal tag fastening system 100 is attached to the vehicle 101, wherein an exterior side of the safety window 110 is exposed to the area exterior to the vehicle 101 and an interior side of the safety window 110 is exposed to the area interior to the vehicle 101. The safety window 110 is designed in a way such that a tag 105 located on the interior of a vehicle 101 and behind the interior side of the safety window 110 may be viewed by someone external to the vehicle 101 peering at the exterior side of said safety window 110. Therefore, in the preferred embodiment, the safety window 110 is transparent. In a preferred embodiment, the safety window 110 comprises a laminated glass that is both transparent and impact resistant. In order for the tag 105 to be placed in a position that would allow it to be viewable to someone external to the vehicle 101, an aperture having an internal opening and extending to an external opening allows for a tag to be displayed behind the interior side of said safety window, wherein said external opening of the aperture is covered by the safety window 110. The aperture itself is defined by an aperture wall, which preferably comprises the frame of the vehicle 101. In a preferred embodiment, the aperture extends through a trunk or hatchback of the rear portion of the vehicle 101 in an area where a tag 105 is traditionally located, as seen in FIG. 1. For instance, a sedan having a trunk may comprise an aperture extending from the interior of the trunk to the exterior of the trunk, wherein the exterior opening of the aperture is covered by the safety window 110 in a way such that a tag 105 located on the interior of the vehicle 101 within the aperture may be viewed by someone external to the vehicle 101. In another preferred embodiment, the system 100 may be located on the front portion of the vehicle 101 so that a tag 105 may be displayed from the front. The size of the aperture is preferably at least as large as the tag 105 that is to be installed using the system 100.

To protect the internal cavity created by the aperture and safety window 110 from external elements such as rain, the safety window 110 may be attached to the vehicle 101 and/or aperture wall using a sealant 112. The safety window 110 and sealant 112 effectively seal the aperture in a way such that it may only be accessed via the interior of the vehicle 101. In a preferred embodiment, the sealant 112 used to adhere the safety window 110 to the vehicle 101 and/or aperture wall is urethane; however, any sealant 112 that creates a water tight barrier between the vehicle 101 and/or aperture wall and the safety window 110 may be used. In some embodiments of an internal tag fastening system 100, the safety window 110 may be design in a way such that it may be removed. In cases such as this, weather stripping may be used to create a water tight seal between the vehicle 101 and/or aperture wall and the safety window 110. For instance, an internal tag fastening system 100 having a replaceable safety window 110 that is locked in place using an internal locking mechanism may create a water tight barrier with the vehicle 101 via a rubber weather stripping along the edge of the safety window 110.

A sleeve 125 is fitted within the aperture to allow for a holder 115 to be secured within the sleeve so that the holder 115 may display the tag 105 via the safety window 110. In a preferred embodiment, the sleeve 125 is comprised of an ABS plastic or metal. As depicted in FIGS. 3 and 4, the sleeve 125 has a rectangular box shape that fits within the rectangular box shaped aperture; however, one with skill in the art will recognize that the sleeve 125 can comprise any shape so long as it can fit within the aperture and allow for a tag 105 and its holder 115 to pass through to the safety window 110. The sleeve 125 may be fastened to the aperture wall using a binder or a mechanical fastener, such as rivets, screws, nails, bolts, etc. In one preferred embodiment, the sleeve 125 has a plurality of grooves that may act as tracks to guide the holder 115 into an optimal position for display of the tag 105. In another embodiment, the sleeve 125 may possess at least one magnet that may be used to secure the holder 115 in a position within the aperture relative to the sleeve 125 and the safety window 110. These magnets may also be used to secure the holder 115 in an optimal position for displaying the tag 105. For instance, a holder 115 and sleeve 125 may comprise at least one magnet that align to secure a holder 115 and its tag 105 in an optimal position behind the safety window 110. In yet another preferred embodiment, the sleeve 125 may comprise at least one hole that may accept a mechanical fastener 117 of a holder 115. Further, the vehicle 101 may also comprise at least one hole that accepts a mechanical fastener 117 of a holder 115 in conjunction with the at least one hole of the sleeve 125.

The holder 115 is designed to fit within the sleeve 125 and lock into place so that it doesn't move around within the aperture. In a preferred embodiment, the sleeve 125 is comprised of an ABS plastic or metal. The height and width of the holder 115 is preferably at least as large as the tag 105. In some embodiments of an internal tag fastening system 100, the height and width of the holder 115 may be smaller than that of the tag 105. The holder 115 comprises a plate side and an internal side. In a preferred embodiment, the holder 115 has a rectangular box shape that fits within the rectangular box shaped sleeve 125, as illustrated in FIGS. 2-4; however, one with skill in the art will recognize that the holder 115 can comprise any shape so long as it can fit within the sleeve 125 and possess a plate side and internal side. The plate side of the holder 115 allows for attachment of a tag 105. In a preferred embodiment of a holder 115, the plate side of the holder 115 comprises a raised portion on each edge that is generally perpendicular to the plate side and surrounds a face of the plate side. A slot extending through the raised portion and parallel to the face allows for a tag 105 to be secured to the plate side of the holder 115, as illustrated in FIGS. 3 and 4. In another embodiment of a holder 115, a plurality of magnets or adhesive strips may allow for a tag 105 to be secured in the holder 115 in a way such that the tag 105 may be displayed through the safety window 110. The tag 105 is preferably secured to the holder 115 in way such that depictions on the tag 105 are viewable. For instance, a license plate having a blank side and a side with a registration number imprinted is preferably secured to the plate side of the holder 115 in a way such that the registration number is viewable.

In one preferred embodiment of a holder 115, the holder 115 may comprise a mechanical fastener 117 that may be used to secure the holder 115 within the sleeve 125, as illustrated in FIGS. 3 and 4. The mechanical fastener 117 of the preferred embodiment is at least one bolt 117. The mechanical fastener 117 is preferably attached to the holder 115 in a way such that it may be slideably manipulated. In one version of a holder 115 having at least one bolt 117, a user may move the bolt in a way such that the at least one bolt 117 makes contact with the sleeve 125. Friction force created between the at least one bolt 117 and sleeve 125 may then prevent the holder 115 from changing positions within the sleeve 125. The portion of the at least one bolt 117 in contact with the sleeve 125 may further be coated in a high friction/gripping material such as rubber. Further, the sleeve 125 itself may be at least partially coated with a high friction/gripping material that may prevent the holder 115 from changing position. In another preferred embodiment, the sleeve 125 may comprise at least one hole, wherein the mechanical fastener 117 of the holder 115 is designed to fit within the at least one hole of the sleeve 125. In yet another preferred embodiment, the vehicle 101 may also have at least one hole designed to accept the mechanical fastener 117 of the holder 115. The at least one hole and mechanical fastener 117 may be designed to align in a way that allows for optimal display of the tag 105 through the safety window 110.

In some preferred embodiments of a holder 115, the holder 115 may further comprise a gasket 118. The gasket 118 may be used to prevent physical contact between the tag 105 within the holder 115 and the safety window 110. In a preferred embodiment, the gaskets 118 are attached to the holder 115 on the plate side, as depicted in FIGS. 3 and 4. In another preferred embodiment, the gasket 118 is comprised of a rubber material that may be used to minimize vibrations and prevent physical damage to the safety window. In yet another preferred embodiment, the holder 115 may further comprise a handle 120, as depicted in FIGS. 2-4. The handle 120 may be used to help remove or insert the holder 115 into the sleeve 125 of the internal tag fastening system 100. In one preferred embodiment, a trigger on the handle 120 may allow a user to manipulate the mechanical fastener 117 of the holder 115 in a way such that the holder 115 may be removed from the sleeve 125. For instance, compression of the trigger on the handle 120 may cause compression of a spring that applies constant pressure on the mechanical fastener 117, causing the mechanical fastener 117 to retract in a way such that it is no longer within the at least one hole of the sleeve 125.

FIG. 5 provides a flow chart 500 illustrating certain, preferred method steps that may be used to carry out the process of installing a tag 105 within the internal tag fastening system 100. Step 505 indicates the beginning of the method. During step 510, a user may obtain a vehicle 101 having an internal tag fastening system 100. Once the user has obtained the vehicle 101 having and internal tag fastening system 100, the user may obtain and tag 105 during step 515. The user may then open the vehicle 101 in a way that will grant them access to the internal tag fastening system 100 during step 520. In a preferred embodiment, the user may access the internal tag fastening system 100 by opening a trunk or hatchback located at the rear portion of the vehicle 101. Once the internal tag fastening system 100 is accessible to the user, the user may unlock the holder 115 of the internal tag fastening system 100 during step 525 so that the holder 115 may subsequently be removed from the sleeve 125 located within the aperture during step 530. The user may then check the tag 105 holder 115 to determine whether or not a prior tag was installed within the internal tag fastening system 100 at an earlier time during step 535.

Based on the results of the check, the user may decide which action to take during step 540. If the user determines that no prior tag exists within the internal tag fastening system 100, the user may proceed install the license in a way such that depictions on the tag 105 are viewable during to step 550. If the user determines that a prior tag was previously installed in the holder 115 of the internal tag fastening system 100, the user may remove the prior tag during step 545 and subsequently proceed to step 550. Once the tag 105 has been installed, the user may reinsert the holder 115 into the sleeve 125 and lock the holder 115 into place during step 555 and step 560, respectively. The user may then close the vehicle 101 in way that no longer grants them access to the internal tag fastening system 100 during step 565 and check to make sure that the tag 105 is viewable during step 570. Based on the results of the check, the user may decide which action to take during step 575. If the user determines that the tag 105 is not viewable, the method may proceed to step 520. If the user determines that the tag 105 is viewable, the method may then proceed to the terminate method step 580.

FIG. 6 provides a flow chart 600 illustrating certain, preferred method steps that may be used to carry out the process of removing a tag 105 from the internal tag fastening system 100. Step 605 indicates the beginning of the method. During step 610, a user may obtain a vehicle 101 having an internal tag fastening system 100 with a tag 105 installed. Once obtained, the user may open the vehicle 101 in a way that will grant them access to the internal tag fastening system 100 during step 520. step 615. The user may then unlock the holder 115 of the internal tag fastening system 100 during step 620 and subsequently remove the holder 115 from the sleeve 125 during step 625. The user may then remove the tag 105 from the holder 115 during step 630. Once the tag 105 has been removed, the user may reinsert the holder 115 into the sleeve 125 and lock the holder 115 into place during step 635 and step 640, respectively. The user may then close the vehicle 101 in a way that will no longer grant them access to the internal tag fastening system 100 during step 645, and the method may proceed to the terminate method step 650.

Although the systems 100 and processes of the present disclosure have been discussed for use within the vehicle tag attachment field, one of skill in the art will appreciate that the inventive subject matter disclosed herein may be utilized in other fields or for other applications in which an internal means of attachment for exterior display is needed. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results unless otherwise stated. It will be readily understood to those skilled in the art that various other changes in the details, materials, and arrangements of the parts and process stages which have been described and illustrated in order to explain the nature of this inventive subject matter can be made without departing from the principles and scope of the inventive subject matter.

What is claimed is:

1. An internal tag fastening system comprising:
   a safety window covering an aperture,
      wherein said aperture is defined by an internal opening, external opening, and aperture wall,
      wherein said aperture is of a size that allows for a tag to pass through said aperture for display via said safety window,
      wherein a sealant creates a seal between said safety window and said aperture wall at said external opening,
   a sleeve that fits within said aperture, and
   a holder shaped to fit within said sleeve,
      wherein said holder has an internal side and a plate side,
      wherein said holder further comprises a slot and edges having a raised portion extending generally perpendicularly to said plate side and surrounding a face of said plate side,
      wherein said slot extends through said raised portion and parallel to said face, and
      wherein said slot allows for insertion of said tag such that said tag is secured by said holder via said raised portion and on said face in a way that allows for viewing of depictions on said tag.

2. The system of claim 1, further comprising a vehicle having said aperture.

3. The system of claim 1, wherein said holder further comprises a mechanical fastener, wherein said mechanical fastener secures said holder in a position relative to said safety window and said sleeve.

4. The system of claim 3, wherein said mechanical fastener is slideably attached to said holder.

5. The system of claim 4, wherein said sleeve further comprises at least one hole, wherein said at least one hole accepts said mechanical fastener.

6. The system of claim 5, wherein said aperture wall further comprises at least one hole, wherein said at least one hole of said aperture wall accepts said mechanical fastener in conjunction with said at least one hole of said sleeve.

7. The system of claim 1, wherein said holder and said sleeve further comprise at least one magnet to hold said holder in a position relative to said safety window and said sleeve.

8. The system of claim 1, wherein said holder further comprises a gasket, wherein said gasket prevents said tag from physically contacting said safety window.

9. The system of claim 1, wherein said holder further comprises at least one magnet,
   wherein said at least one magnet secures said tag in a position relative to said plate side of said holder.

10. The system of claim 1, wherein said holder further comprises a handle, wherein said handle is used to assist insertion and removal of said holder from said sleeve.

11. The system of claim 10, wherein said holder further comprises at least one bolt, wherein said at least one bolt secures said holder in a position relative to said safety window and said sleeve, wherein said handle further comprises a trigger, wherein compression of said trigger causes said at least one bolt of said holder to retract in a way such that said holder is removeable from said sleeve.

12. An internal tag fastening system comprising:
   a vehicle having an aperture,
      wherein said aperture is of a size that allows a tag to pass through for display,
   a safety window covering said aperture of said vehicle,
      wherein said safety window is attached to said vehicle via a sealant, a sleeve that fits within said aperture, and
   a holder having a shape that fits within said sleeve, wherein said holder further comprises:
      a slot and edges having a raised portion extending generally perpendicular to said plate side and surrounding a face of said plate side,
         wherein said slot extends through said raised portion and parallel to said face, and
         wherein said slot allows for insertion of said tag such that said tag is secured within the holder via said raised portion and to said face in a way that allows viewing of depictions on said tag,
      at least one bolt, wherein said at least one bolt secures said holder in a position relative to said safety window and said sleeve, and
      a gasket, wherein said gasket prevents said tag from physically contacting said safety window, and
      a handle.

13. The system of claim 12, wherein said at least one bolt is slideably attached to said at least one holder.

14. The system of claim 13, wherein said sleeve further comprises at least one hole, wherein said at least one hole accepts said at least one bolt.

15. The system of claim 14, wherein said vehicle further comprises at least one hole along said aperture, wherein said at least one hole of said vehicle accepts said at least one bolt in conjunction with said at least one hole of said sleeve.

16. The system of claim 12, wherein said holder further comprises at least one magnet,
   wherein said at least one magnet secures said tag in a position relative to said plate side of said holder.

17. The system of claim 12, wherein said handle further comprises a trigger, wherein compression of said trigger causes said at least one bolt of said holder to retract in a way such that said holder is removeable from said sleeve.

18. A process for installing a tag using an internal tag fastening system, wherein said process comprises the steps of:
   obtaining a vehicle having an internal tag fastening system,
   obtaining a tag,
   opening a rear portion of said vehicle to access said internal tag fastening system, unlocking a holder of said internal tag fastening system in a way such that said holder is removable from said rear portion of said vehicle,
   removing said holder from a sleeve of said internal tag fastening system,
   inserting said tag into said holder in a way such that depictions on said tag are viewable,
   inserting said holder into said sleeve in a way such that said tag is viewable via a safety window,
   locking said holder in a way such that said holder is not removeable from said rear portion of said vehicle, and
   closing said rear portion of said vehicle.

19. The process of claim 18, further comprising the steps of,
   checking a slot of said holder for a prior tag,
   removing said prior tag from said holder.

* * * * *